Sept. 6, 1960

H. A. SILL 2,951,741

PROCESS FOR TREATING COMPLEX ORES

Filed Aug. 5, 1955

HARLEY A. SILL
INVENTOR.

BY Lyon & Lyon
ATTORNEYS

United States Patent Office 2,951,741
Patented Sept. 6, 1960

2,951,741

PROCESS FOR TREATING COMPLEX ORES

Harley A. Sill, Los Angeles, Calif., assignor to Metallurgical Resources, Inc., New York, N.Y., a corporation of Delaware Filed Aug. 5, 1955, Ser. No. 526,596

12 Claims. (Cl. 23—53)

This invention relates to a process for separating arsenic and sulphur from complex ores containing other mineral constituents such as cobalt, nickel, lithium, etc.

A variety of processes have been employed to separate sulphur and arsenic from complex ores containing one or both of these elements, of which the common ores of cobalt and nickel may be cited as examples. In most cases both sulphur and arsenic occur in the ore and substantially complete elimination of sulphur and arsenic from the concentrates is necessary for the economic recovery of the metallic values in the ore. It is desirable that provision be made for maximum recovery of the sulphur and arsenic, both as secondary values and to prevent contamination of vegetation in the surrounding country by poisonous fumes. Roasting methods, in which the arsenic is recovered as arsenious oxides, have obvious disadvantages, particularly in that a large baghouse capacity is required, the removal of arsenic is seldom more than eighty percent complete, the residual material is left in a form unsuitable for further separation processes, and the sulphur dioxide fumes produced have a deleterious action on vegetation unless special collection methods are employed. Two-step roasting methods in which the sulphur only is first expelled and the arsenic is leached from the roast to recover soluble arsenates have the disadvantage of requiring an extra step and do not overcome the disadvantages with respect to the form of the residual material, and with respect to sulphur dioxide fumes. Chlorination processes, in which the arsenic and sulphur are obtained as arsenic chloride and sulphur chloride, have been found to be impractical due to the large amount of chlorine consumed, the difficulty of recovery of the chlorine, and the poisonous nature of the products.

The principal object of this invention is to provide a method for recovering arsenic and sulphur which will avoid the disadvantages of the methods which have been employed heretofore and which will produce the arsenic and sulphur in easily handled form having, at least in the case of the arsenic, a profitable commercial market.

A further object of the invention is to provide a commercially profitable method for the removal of arsenic and sulphur from the remaining constituents of the ore, which will leave the residual primary values in a form which facilitates their further separation and purification. In particular, it is an object of the invention to provide a process for the purposes stated which will eliminate the undesirable accumulation in the residual values of insoluble ferrites and other difficultly soluble particles other than metallic oxides, such as are commonly produced in roasting processes.

Another object of the invention is to provide a separation process in which simple and easily obtainable apparatus may be employed, and which may be conveniently carried out as a continuous process adapted for large-scale operations.

Other objects and advantages of this invention it is believed will be readily apparent from the following description, when taken in connection with the accompanying drawings.

The process according to the present invention consists essentially of a caustic solution treatment in which oxidation of the ore constituents is achieved by the introduction of finely divided air, followed by a series of steps directed to the separation and recovery of the arsenic and sulphur. In practice, the use of air as the sole oxidizing agent is effective and is preferable both for reasons of economy and to avoid contamination of the reaction products by other chemicals; the use of other oxidizing chemicals, while not generally preferable, but may be regarded as supplemental and as a safeguard when there is doubt as to whether the process has been properly carried out. The arsenic and sulphur are obtained in the form of soluble alkali metal salts, while the primary metallic values are obtained in an insoluble elemental state or as insoluble oxides.

Figure 1:
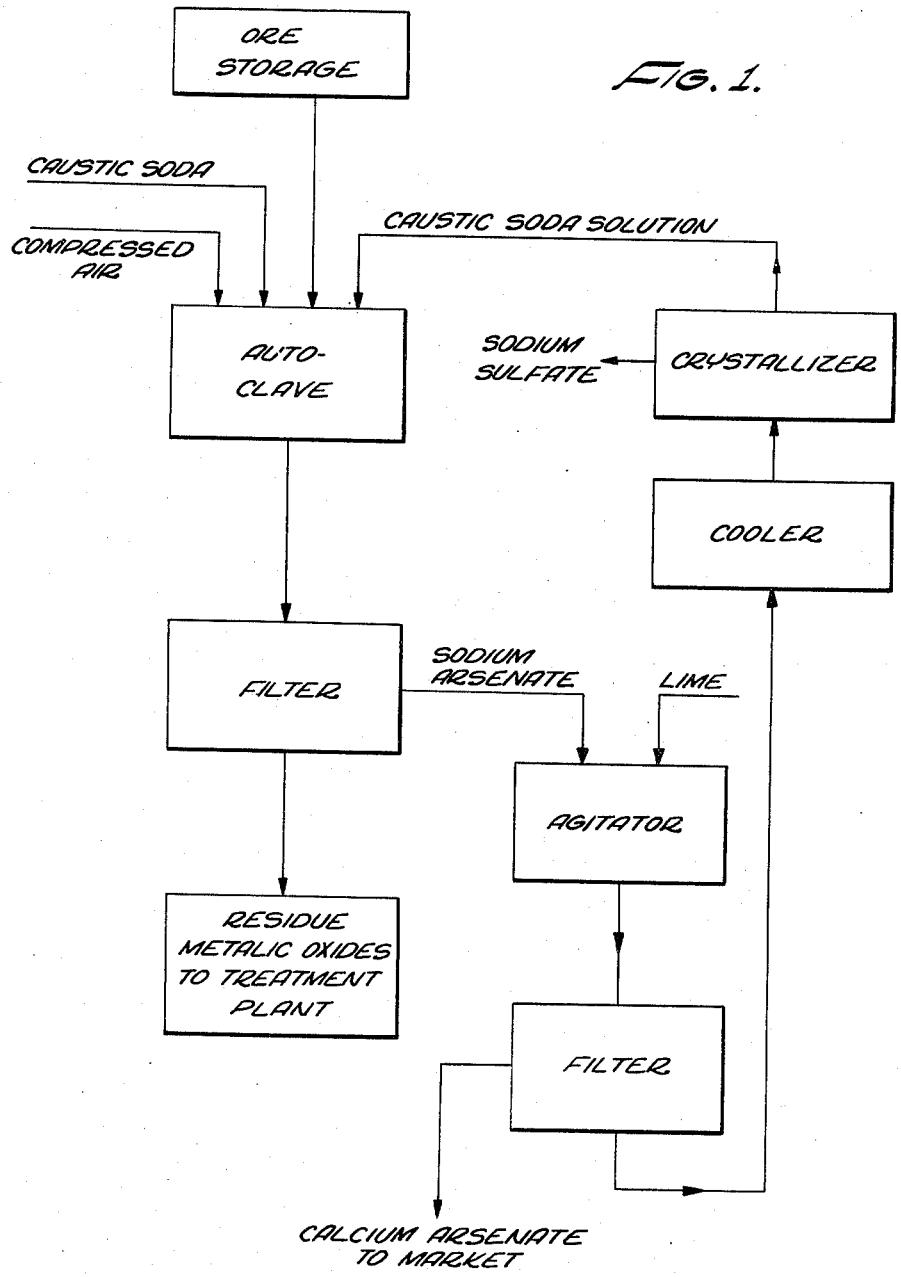
Figure 1 is a flow sheet illustrating the process of the invention.

The various steps in the preferred process are illustrated in the accompanying flow sheet (Figure 1). After the usual preliminary mechanical concentration, the ore is reduced in a wet ball mill to a suitable fineness, a fineness of approximately 200 mesh or finer being preferable. During the reaction, each particle of sulfarsenide mineral is covered by a coating of metal oxide. This adhering coating will slow down the penetration of the reacting caustic solution into the ore particles. With the coarses particles, the reaction time is slowed down considerably but with mineral particles 200 mesh or finer, the contact of the solution with the mineral particle is not retarded. Any action which will abrade the metallic oxide coating away from the unaltered particles will be advantageous. The concentrate is reacted in an autoclave with sufficient caustic soda solution to provide an excess of caustic over the calculated theoretical amount required to convert the sulphur and arsenic in the ore to sodium sulphate and sodium arsenate, respectively. Compressed air or oxygen in a finely divided condition is continuously introduced during the reaction, and the temperature is maintained by heating as required within the range of approximately 100 to 200° C. The preferred temperature is approximately 150° C., although the temperature is not critical.

The pressure is maintained in the approximate range of 50 to 200 pounds per equare inch, with continued agitation and introduction of air for a suitable period. The reaction time varies with the fineness and other characteristics of the ore, and with pressure and temperature. Generally, from 8 to 16 hours is sufficient. After sufficient time has elapsed for the reaction to be completed, the pulp can be withdrawn from the autoclave continuously through a pressure reduction valve, after which the soluble salts in the reaction products are separated by settling and/or filtration methods.

The amount of caustic solution should be adjusted so the calculated production of sodium arsenate and sodium sulphate will be completely dissolved and the solution will as nearly as possible be saturated with the two salts at a convenient temperature for filtration, in order to avoid unnecessary handling of solution. An excess of sodium hydroxide over this theoretical amount is preferred in order to speed the reaction. A suitable temperature for filtration is approximately 75° C. The amount of water, furnished by the caustic solution, required depends of course on the solubility in water at the desired temperature of mixed sodium arsenate and sodium sulphate in the proportions in which they occur in the concentrate under treatment. In practice it will be found that at 75° C. the solubility of sodium arsenate is so great compared to that of sodium sulphate that in most cases only the solubility of the latter alone need be considered in the calculation; the solubility of sodium sulphate at 75° C. is approximately 30 parts in 100 parts of solution. From the solubility figure obtained and the known composition of the ore, it is possible by a simple calculation to arrive at the correct volume of water for any given charge.

The water is cooled to the calculated temperature at which the sulphur and arsenic remain in solution in the form of the sulphate and arsenate, respectively, while the remaining constituents of the ore form an insoluble residue of metallic oxides. The liquid is filtered or settled to remove the residue, which is then treated according to any known process for separating and purifying the primary values in the ore. The filtrate, containing arsenate and sulphate, may be cooled to crystallize as much as possible of the sodium arsenate out of the solution if the sodium arsenate is to be marketed. In the case of the usual ores of the type to which this invention is applicable, the amount of sulphur is much less than the amount of arsenic, and most of the arsenate may be crystallized out while retaining essentially all the sulphate in solution by the choice of a suitable temperature based on the known solubility curves of the arsenate and sulphate. The maximum solubility of sodium sulphate occurs at approximately 32° C. (transition point) and this is, therefore, the most advantageous temperature for separation of the arsenate. The sodium arsenate thus recovered forms a profitable, marketable product. Alternatively if calcium arsenate is desired, as shown in the flow sheet, the sodium arsenate in the solution may be treated with lime to obtain calcium arsenate and sodium hydroxide, and the latter may be re-used. The regenerated sodium hydroxide solution contains sodium sulfate which may be recovered by cooling and recrystallization.

The process may be easily adapted for continuous operation by employing a number of autoclaves in series, each autoclave being successively discharged into the next until the required reaction time has elapsed.

Figure 2:
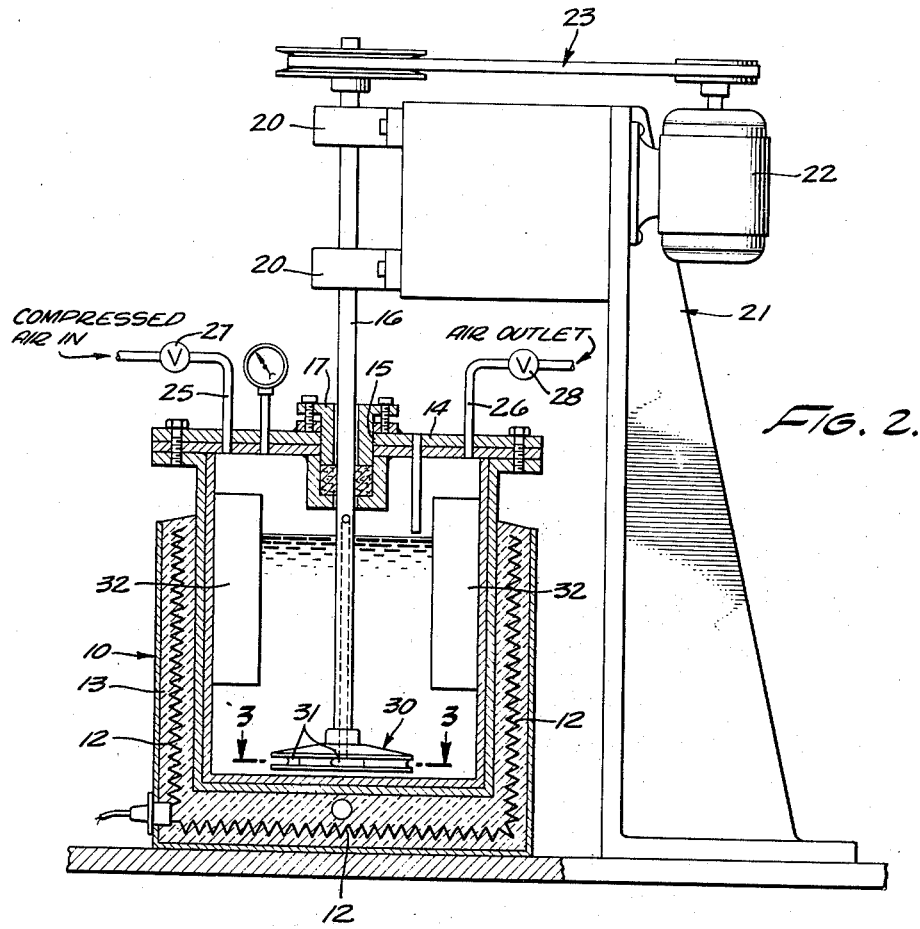
Figure 2 is a side elevation, partly in section, of apparatus useful in carrying out the invention.
Figure 3:
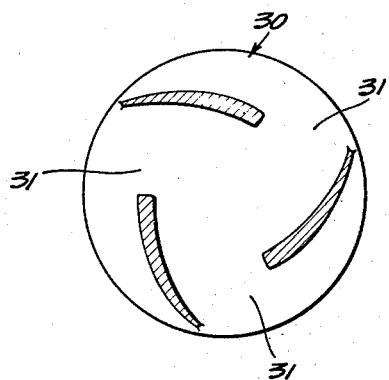
Figure 3 is a sectional elevation taken substantially on the line 3—3 of Figure 2.

An autoclave 10 adapted for use in carrying out the process of this invention is illustrated in Figures 2 and 3 and comprises a pressure vessel provided with heating elements 12 and suitable insulation 13. The vessel is further provided with a top cover member 14 having a central opening 15 through which extends a hollow shaft 16, a packing gland 17 being provided between the opening and the shaft. The shaft 16 is mounted for rotation in suitable bearings 20 supported on a frame 21, and driven by means of a motor 22 through the power transmission 23. The top cover member 14 is provided with compressed air inlet and outlet lines 25 and 26, respectively, each provided with a valve 27, 28.

Means are provided for introducing finely divided air into the body of fluid contained in the autoclave, and as shown in the drawings, these means may include a conventional flotation impeller 30 mounted at the lower end of the shaft 16, the openings 31 in the impeller communicating with the bore in the hollow shaft. A plurality of openings are provided in the shaft above the fluid level and air enters through the holes, whence it is drawn downwardly through the shaft and outwardly through the openings in the impeller wherein the air is broken up into finely divided bubbles.

The autoclave 10 is provided with a plurality of stationary baffles 32 which cooperate with the flotation impeller 30 to agitate the fluid contained in the autoclave.

A typical ore concentrate serving as an example of the complex ores to which the invention is advantageously employed may have the following composition:

| | Percent |
|---|---|
| Arsenic | 40 |
| Sulphur | 10 |
| Iron | 20 |
| Cobalt | 9 |
| Nickel | 2 |
| Copper | 0.5 |
| Silver | 0.5 |

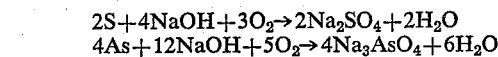

The following example of the process as applied to an ore having this composition is to be taken as illustrative only, and shows typical quantities of materials calculated for the given ore:

The amount of caustic which will be required to convert all the arsenic and sulphur into arsenate and sulphate, respectively, may be calculated from the following equations:

$$2S + 4NaOH + 3O_2 \rightarrow 2Na_2SO_4 + 2H_2O$$
$$4As + 12NaOH + 5O_2 \rightarrow 4Na_3AsO_4 + 6H_2O$$

For the given example, 1780 lbs. of caustic soda is the calculated amount per ton of concentrate to react with the available arsenic and sulphur. It has been found that an excess of at least 20% is advantageous, and somewhat more complete elimination of arsenic and sulphur is achieved with an excess of up to 70%. Consequently, for an ore having the composition indicated above, a weight of caustic approximately equivalent to 1 to 1½ times the weight of concentrate is preferably employed, depending on factors of economy and purity of the products desired. The caustic soda combined with the arsenic is regenerated for reuse in the process if calcium arsenate is produced as described above. In order that regeneration of the caustic soda shall be complete, the strength of caustic should be about 10%. In this case, any sodium carbonate present in the solution is causticized by the lime. The dilution—that is, the ratio of ore to solution—should be such that the solution will contain sufficient caustic soda to combine with the sulfur and arsenic, together with the required excess. The amount of solution will also depend on the content of soluble salts. Sufficient solution is used to prevent crystallization during filtration and other handling. The solubility of oxygen in strong caustic solutions is less than in the weaker strength solutions.

1000 lbs. of concentrate ground to pass a 200 mesh screen is introduced into the autoclave 10 containing 5 tons of 10% caustic soda solution. A strong current of compressed air is introduced continuously through the impeller 30 and contributes to the agitation. The temperature is maintained at approximately 50° C. and the pressure at about 100 pounds per square inch for about 8 hours. The solution, at about 75° C., is filtered to remove the insoluble residue containing the oxides of iron, cobalt, nickel, copper and silver in the ore. The metallic oxides may then be subjected to any desired separation process. The filtrate is treated with lime to obtain the calcium arsenate as a commercial product. To prevent build up in the circuit, while the regenerated caustic is being recirculated, the sodium sulphate can be removed by cooling and crystallization.

The following table represents the results of the above-described example:

Tabulated results

| Product | Amount, Pounds | Percent As | Arsenic, Pounds | Percentage Arsenic | Percent S | Sulphur, Pounds | Percentage Sulphur |
|---|---|---|---|---|---|---|---|
| Feed | 1,000 | 37.0 | 370 | 100 | 10.0 | 100 | 100 |
| Residue | 567 | 2.4 | 13.6 | 3.7 | 0.72 | 4.1 | 4.1 |
| Solution | 10,000 | 3.52 | 352 | 95.0 | 0.96 | 96.0 | 96.0 |

The residue of metallic oxides contained practically all of the metal content of the original ore as a very finely divided brown powder.

By the process according to the invention, the arsenic content of the filtered oxide residues is reduced to about 2% or even less, and the removal of sulphur is substantially complete. No sulphur or arsenic fumes are produced in the process.

It has been found that the process of this invention may be carried out by using other basic solutions such as solutions (i.e., about 10% by weight) of sodium carbonate in place of the sodium hydroxide or other caustic solution, the other process conditions, such as pressure and temperature, being the same.

It is thought that the mode of carrying out the invention and its applications will be apparent from the above description of the various parts and their purpose. Although only the preferred forms of the invention have been described, it will be apparent to those skilled in the art that numerous details of the invention may be varied without departing from the spirit of the invention or the scope of the appended claims.

I claim:

1. A process for separating arsenic and sulphur from complex ore concentrates containing other minerals, which includes the steps of treating the concentrate with an aerated basic solution under an elevated pressure and at a temperature of approximately 100 to 200° C. to convert the arsenic and sulphur to soluble alkali metal salts, and separating the soluble salts from the remainder of the products of the reaction.

2. A process for separating arsenic and sulphur from complex ore concentrates containing other minerals, which includes the steps of treating the concentrate with an aerated caustic soda solution under an elevated pressure and at a temperature of approximately 100 to 200° C. to convert the arsenic and sulphur to soluble sodium salts, and separating the soluble salts from the remainder of the products of the reaction.

3. A process for separating arsenic and sulphur from complex ore concentrates containing other minerals, which consists in treating the concentrate with an aqueous solution of a basic alkali metal compound under a pressure of approximately 50 to 200 pounds per square inch and a temperature of approximately 100 to 200° C. in the presence of air to convert the arsenic and sulphur to soluble sodium salts, and separating the soluble salts from the remainder of the products of the reaction.

4. A process for separating arsenic and sulphur from complex ore concentrates containing other minerals, which consists in treating the concentrate with a sodium hydroxide solution under a pressure of approximately 50 to 200 pounds per square inch and a temperature of approximately 100 to 200° C. in the presence of air to convert the arsensic and sulphur to soluble alkali metal salts, and separating the soluble salts from the remainder of the products of the reaction.

5. A process for separating arsenic and sulphur from complex ore concentrates containing other minerals, which consists in treating the concentrate with sodium hydroxide solution in the presence of finely divided air at a temperature of approximately 100 to 200° C. and a pressure of approximately 50 to 200 pounds per square inch to convert the arsenic and sulphur to soluble sodium salts, and separating the soluble salts from the remainder of the products of the reaction.

6. A process for separating arsenic and sulphur from complex ore concentrates containing other minerals, which consists in treating the concentrates with an excess of sodium hydroxide solution under a pressure of approximately 50 to 200 pounds per square inch and at a temperature of 100 to 200° C. in the presence of finely divided air to convert arsenic and sulphur to sodium arsenate and sulphate and the other minerals to oxides, separating the solution from the mineral oxides, and separating the sodium arsenate from the solution.

7. A process for separating arsenic and sulphur from complex ore concentrates containing other minerals, which consists in treating the concentrates with an excess of sodium hydroxide solution under a pressure of approximately 50 to 200 pounds per square inch and at a temperature of 100 to 200° C. in the presence of finely divided air to convert arsenic and sulphur to sodium arsenate and sulphate and the other minerals to oxides, separating the solution from the mineral oxides, and separating the sodium arsenate from the solution by reaction with lime.

8. A process for separating arsenic and sulphur from complex ore concentrates containing other minerals, which consists in treating the concentrates with an excess of sodium hydroxide solution for approximately 8 to 16 hours at a temperature of 150° C. and pressure of 100 pounds per square inch in the presence of finely divided air to convert the arsenic and sulphur to sodium arsenate and sulphate and the other minerals to oxides, separating the solution from the mineral oxides, and separating the sodium arsenate from the solution by reaction with lime.

9. A process for removing arsenic from a complex arsenical material containing water-insoluble arsenic and other metal values, comprising the steps of: mixing said material in finely divided, solid form with an aqueous solution of a basic alkali metal compound under an elevated pressure and at a temperature of approximately 100 to 200° C. while introducing an oxygen-containing gas into said mixture to convert the arsenic into a water-soluble alkali metal arsenate and dissolve same in said solution, and then separating said solution from the insoluble residue.

10. A process for removing arsenic from a complex arsenical material containing water-insoluble arsenic and other metal values, comprising the steps of: mixing said material in finely divided, solid form with an aqueous solution of a basic alkali metal compound under a pressure of approximately 50 to 200 pounds per square inch and at a temperature of approximately 100 to 200° C. while introducing air into said mixture to convert the arsenic into a water-soluble alkali metal arsenate and dissolve same in said solution, and then separating said solution from the insoluble residue.

11. The process of claim 10 wherein the basic alkali metal compound is sodium hydroxide.

12. The process of claim 10 wherein the basic alkali metal compound is sodium carbonate.

References Cited in the file of this patent

UNITED STATES PATENTS

| | | |
|---|---|---|
| 1,528,004 | Bassett et al. | Mar. 3, 1925 |
| 1,596,662 | Jenkins et al. | Aug. 17, 1926 |
| 1,970,147 | Levy | Aug. 14, 1934 |

OTHER REFERENCES

Mellor: "Comprehensive Treatise on Inorganic and Theoretical Chemistry," vol. 10, 1930, pp. 101, 260; vol. 9, page 150 (1929).